United States Patent [19]
Asche

[11] Patent Number: 5,481,078
[45] Date of Patent: Jan. 2, 1996

[54] OPERATOR PRESENCE SENSOR FOR OPERATOR'S SEAT

[75] Inventor: James E. Asche, Milnor, N. Dak.

[73] Assignee: Clark Equipment Company, South Bend, Ind.

[21] Appl. No.: 198,285

[22] Filed: Feb. 18, 1994

[51] Int. Cl.$^6$ ............... B60K 28/00; H01H 3/14
[52] U.S. Cl. ............ 200/85 A; 180/273; 338/32 H; 340/667
[58] Field of Search ............ 307/10.1; 180/273; 340/667; 200/85 R, 85 A, 61.58 R; 338/32 H; 335/205, 207

[56] References Cited

U.S. PATENT DOCUMENTS

| | | | |
|---|---|---|---|
| 676,263 | 6/1901 | Kitsee . | |
| 704,616 | 7/1902 | Charles . | |
| 2,672,203 | 3/1954 | Brown | 180/82 |
| 2,708,005 | 5/1955 | Gazzo | 180/82 |
| 3,211,250 | 10/1965 | Wood | 180/82 |
| 3,334,488 | 8/1967 | Lauck | 60/52 |
| 3,670,119 | 6/1972 | Gebhardt | 200/52 R |
| 3,829,803 | 8/1974 | Maeda | 335/205 |
| 3,911,602 | 10/1975 | Trevathan | 37/86 |
| 3,969,875 | 7/1976 | Nofel | 56/10.2 |
| 4,075,443 | 2/1978 | Fatur | 200/85 A |
| 4,294,327 | 10/1981 | Howard | 180/273 |
| 4,361,741 | 11/1982 | Leskoverc et al. | 200/85 A |
| 4,392,543 | 7/1983 | Buckhouse et al. | 180/272 |
| 4,466,504 | 8/1984 | Giandenoto et al. | 180/273 |
| 4,608,825 | 9/1986 | Fontaine | 60/545 |
| 4,678,058 | 7/1987 | Wooters | 180/273 |
| 4,699,561 | 10/1987 | Tee | 414/699 |
| 5,124,512 | 6/1992 | Huettner et al. | 200/85 A |
| 5,146,054 | 9/1992 | Etters | 200/85 A |

FOREIGN PATENT DOCUMENTS

| | | | |
|---|---|---|---|
| 2407299 | 8/1974 | Germany | 200/85 A |
| 1413000 | 11/1975 | United Kingdom | 200/85 A |

Primary Examiner—Gerald P. Tolin
Attorney, Agent, or Firm—Westman, Champlin & Kelly

[57] ABSTRACT

An operator presence sensor for an operator's seat on equipment, such as skid steer loaders and the like, provides a signal to indicate when the seat is occupied. The operator presence is sensed by permitting seat rails to pivot about their forward end against leaf springs designed to support the seat weight plus a known fraction of an operator's weight so that the rear of the seat is raised when the seat is unoccupied and when an operator occupies the seat the springs deflect and the rear of the seat moves down, resting on a seat support pan. An electronic sensor detects seat position to provide a position signal.

10 Claims, 3 Drawing Sheets

OPERATOR PRESENCE SENSOR FOR OPERATOR'S SEAT

BACKGROUND OF THE INVENTION

The present invention relates to an operator presence sensing system that permits a seat to be mounted on adjustable seat rails for ease of positioning in fore and aft direction, while providing a signal indicating when the seat is supporting more than a desired amount of weight.

Vehicle seat switches have been used in the past for determining the presence of an operator, so that various interlocks can be actuated when the operator is not present on the seat. Improved reliability of these systems is sought, particularly when the vehicle is used where dirt and other foreign objects are present.

It is further desirable to have the seat adjustable in the same manner that they presently are adjustable, while maintaining the reliability of the sensing system.

U.S. Pat. No. 5,124,512 shows a vehicle seat switch which utilizes a base panel that moves up and down and actuates a spring loaded mechanical switch at the forward edge of the unit. A wire type spring or spring frame is utilized and a base plate acts against the spring frames to cause actuation of an existing switch, such as a microswitch. In a second form of the invention a switch actuator comprising a bowed leaf spring that is straightened under load actuates a mechanical switch.

Adjusting the seat utilizing this type of arrangement is not disclosed in the patent, and it appears that making the seat adjustable involves additional structural components, and would complicate the overall operation of the seat.

U.S. Pat. No. 4,075,443 illustrates a type of switching mechanism that operates on the springs within a seat cushion. This permits the seat to be mounted in normal manner on adjustable rails that permit sliding of the seat, but the positioning of a switch for accurate operation in relation to the seat springs is difficult to precisely maintain, and it appears from the construction that adjustment would be difficult.

A sensing apparatus that has switches along the lateral side of the seat is shown in U.S. Pat. No. 4,361,741. The operation relies upon a pivoting plate in one form of the invention, and in another form of the invention depends on deflection of the seat spring itself for actuation. A feature of this patent is to control the force that is applied to the mechanical switch to avoid damage to the switch itself.

SUMMARY OF THE INVENTION

The present invention relates to an operator presence sensor that is sensitive to the presence of an operator in a vehicle seat, and provides a signal indicating if the seat is occupied. The signal is used for further controls such as locking in or locking out of the hydraulic circuits on a skid steer loader. A pivoting seat is provided which has a pivot system that includes a leaf spring below one or both of the two adjustable seat rails and above a seat pan that is used for supporting the seat. The forward edge of each seat rail is clamped to the seat pan permitting no relative movement between the rail and the seat pan. This causes the inclusion of the seat pan into the spring system because of the seat pan and spring deflection that occurs when the operator occupies the seat.

The leaf springs used are directly below the rails, and will support the seat plus a predetermined amount of weight under a spring load, so that the rear of the seat is suspended above the seat pan when the seat is unoccupied. When the operator occupies this seat, the springs deflect and the rear of the seat moves down until the rails rest on the seat pan, and this movement, as shown, is sensed by a Hall effect sensor.

The use of the springs directly under the seat rails permits the seat to be adjusted in a normal manner along the rails, and yet a direct pivoting action of the seat between occupied and unoccupied positions is provider. There can be two leaf springs used, one under each seat rail, or only one leaf spring then preferrably under the rail that is connected to the sensor.

DETAILED DESCRIPTION OF THE PREFERRED EMBODIMENTS

Figure 2:
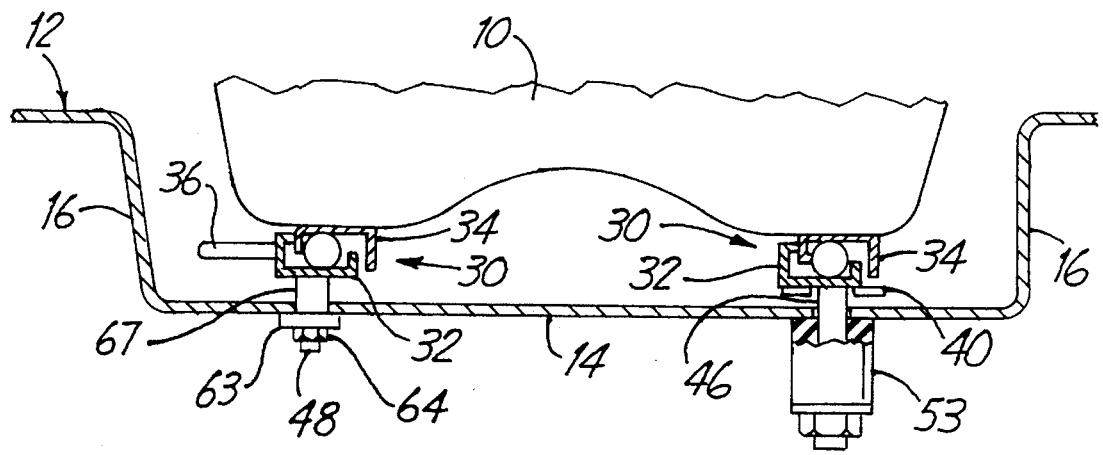
FIG. 2 is a rear elevational view of the seat system of 1.
Figure 3:
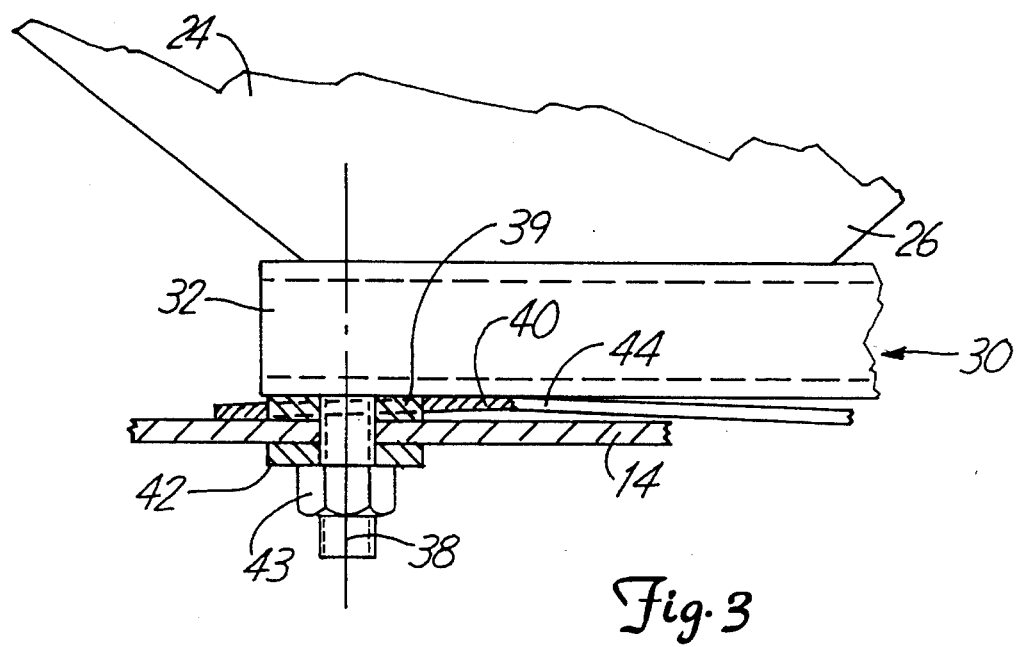
FIG. 3 is an enlarged partial sectional view showing a seat rail attachment used with the system in FIG. 1.

An operator seat indicated 10 which can be for an off road vehicle, such as a skid steer loader, is supported relative to the vehicle frame (not shown) through the use of a seat pan 12 which has a substantially horizontal bottom wall 14, and which is formed with vertical side walls 16 that are formed upwardly to provide reinforcement and mounting. As shown in FIG. 2 schematically, the side walls 16 can have a horizontal attachment flange at the upper edges. The seat pan is supported on a vehicle frame in a suitable manner.

Figure 1:
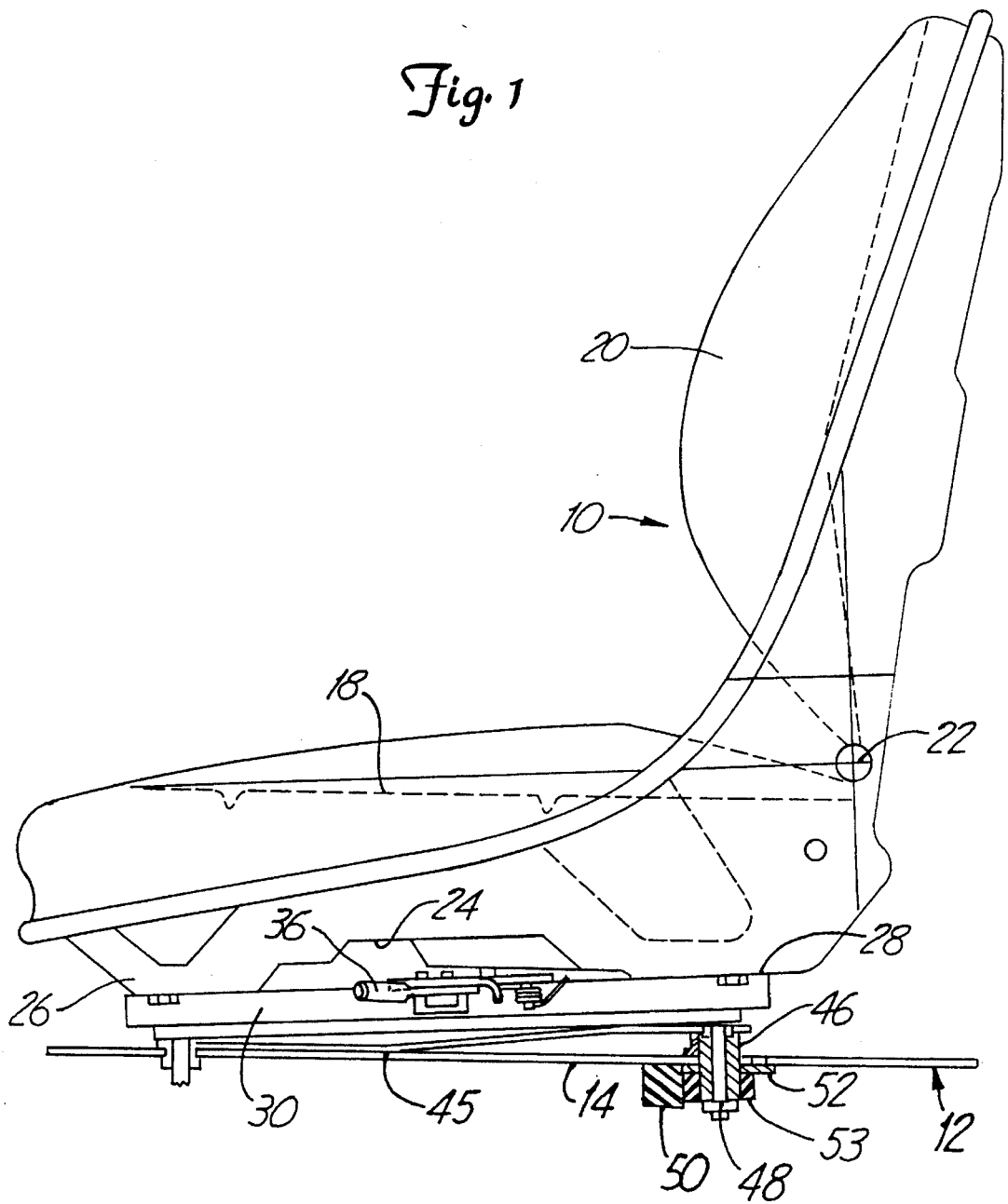
FIG. 1 is a side elevational view of an operator presence sensing system made according to the present invention.

Normally, the seat includes a seat cushion assembly 18, and a back 20, which may be hinged together about a suitable hinge member indicated at 22. The seat cushion assembly 18 generally includes a lower support wall 24 that is formed to provide attachment regions as shown in FIG. 1 comprising bosses 26 at the front, and bosses 28 at the rear. A separate seat rail assembly 30 is then bolted to the seat cushion support wall 24 at each of the bosses 26 and 28 adjacent lateral edges of the seat in a normal manner. The seat rail assemblies 30 permit adjustment of the seat in longitudinal direction. As schematically shown in FIG. 2, the seat rail assemblies include a base rail 32, and a longitudinally sliding upper rail 34. The sliding upper rail 34 of each rail assembly is fastened to the seat support plate 24 at bosses 26 and 28. The upper and lower rails on one rail assembly 30 can be retained from sliding relative to each other by a conventional latch, and by releasing a schematically shown latch lever 36 the two rails of the respective rail assembly on each side of the seat can be slid longitudinally relative to each other on ball bearings. The seat adjustment is used for positioning of the seat in fore and aft direction.

The forward end of the base rail 32 is mounted directly to the seat pan 12 in a relatively flexible, flat portion of wall 14 the pan. The seat wall pan 14 itself is somewhat flexible or springy at the rail front attachment location. A securing member for the seat rail assemblies 30 comprises a threaded stud 38 that is pressed into the base rail 32 and passes through a first spacer washer 39, and then through the seat pan 14. The spacer washer 39 is used for providing a space between the lower surface of the front end of the base rail 32 and the top of the seat pan 14 to provide clearance for a leaf spring 40 that has an opening slightly larger than the spacer washer 39 and receives the washer so the leaf spring can move slightly.

A second washer 42 is used on the lower side of the seat pan wall 14, and a suitable nut 43 is used for tightening the stud 38 down and holding the front end of the base seat rail securely relative to the seat pan 14. The mounting of the base rail 32 is the same on both sides of the seat, and there is a spring 40 on one or both sides of the seat as well.

Spring 40 has a bend adjacent the front end as at 44, so that it rests against the bottom of the base rail 32 and then tapers down toward the top of the seat pan wall 14. In turn the leaf spring has a bend portion 45 approximately a third to one half of the distance toward the rear end of the seat rail assembly, as shown in FIG. 1. The rear of the leaf spring 40 thus extends upwardly so that its rear portion rests against the bottom of the base rail 32 and provides a biasing force tending to lift the rear of the seat rail assembly. Thus the entire seat assembly is moved upwardly away from the seat pan wall 14. Both of the seat rail assemblies 30 on the opposite sides of the seat are supported in the same manner, when two leaf springs are used.

A bushing 46 is mounted onto a stud 48 attached to the rear end of one of the base rails 32 and is held in place on the stud. The bushing 46 fits into a "U" shaped end slot of the spring 40 to hold the spring in place. A sensor support housing wall 50 is bolted to the bottom surface of the seat pan 14 in alignment with the one seat rail carrying the bushing. The bushing 46 passes down through an opening in the seat pan and through an opening in a flange 52 on housing 50. A magnet carrier collar 53 is mounted on the bushing 46 below the flange 52 and as can be seen the collar 53 is larger diameter than the opening in flange 52 so that the collar acts as an upward stop for the seat rail on which it is attached.

It can thus be seen that in normal operation with no operator on the seat, the rail assemblies 30 will be pushed up away from the seat pan, but with greater than a predetermined weight, for example 30 pounds, on the top of the operator's seat, the rear of the seat rail assemblies will pivot downwardly about the fastening of the front ends of the rail assemblies to the seat pan. In effect, the seat pan wall 14 enters into the overall spring system, but permits pivoting seat rail movement as the pan wall 14 deflects when the rear of the seat rail assemblies move downwardly. In place of the seat rail fastening pivot shown, a bearing or other conventional pivot construction can be provided.

Figure 4:
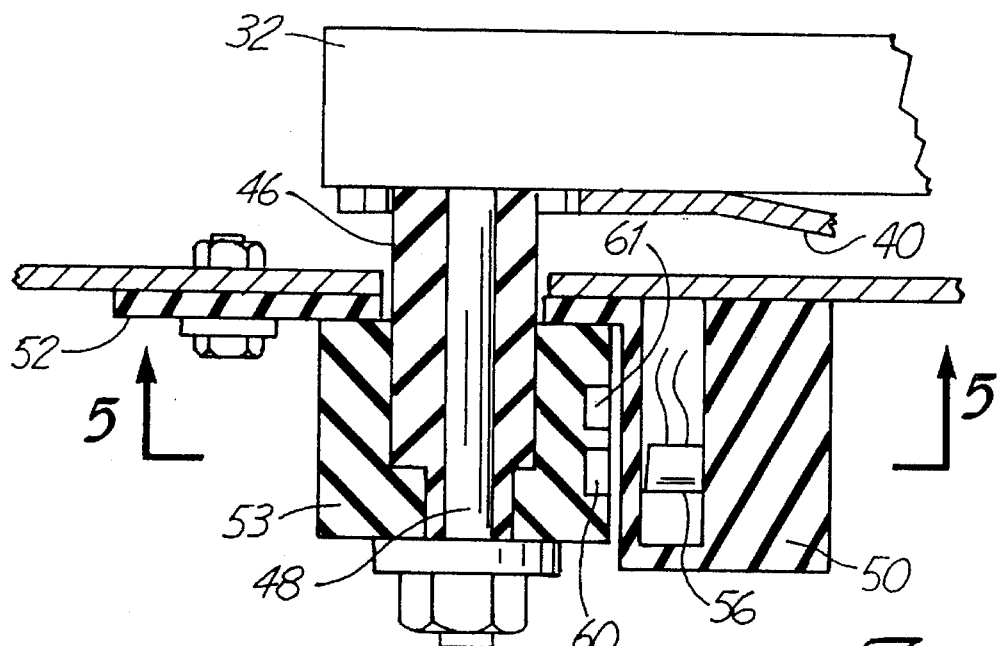
FIG. 4 is an enlarged sectional view of the sensor assembly used in the operator presence sensing system of the present invention.
Figure 5:
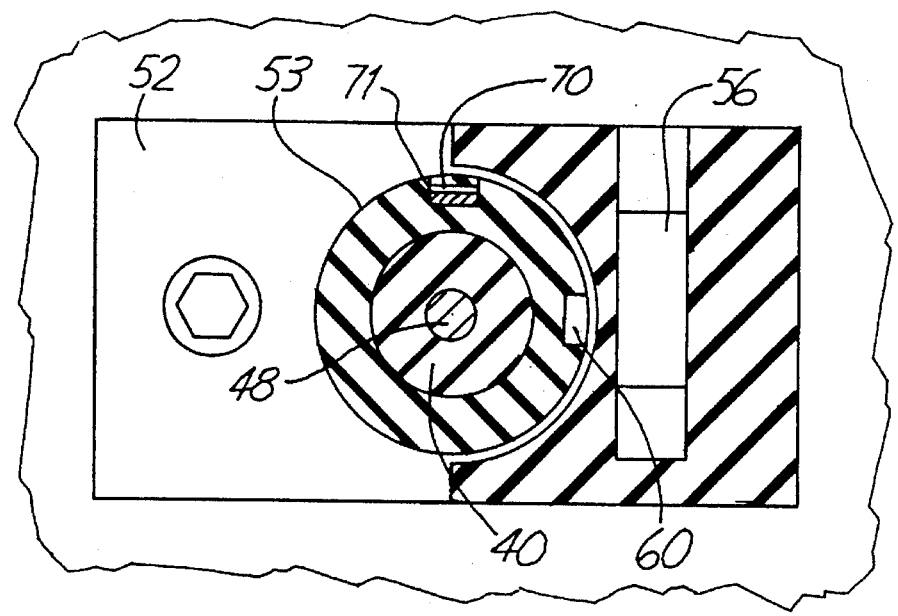
FIG. 5 is a sectional view taken as in line 5—5 in FIG. 4.

The housing 50 includes a portion adjacent the magnet carrier collar 53. A Hall effect sensor 56 is mounted in the housing 50 and is positioned in alignment with a first magnet 60 on the magnet carrier collar with the seat unoccupied as shown in FIG. 4. When the predetermined weight is applied the rear of the seat the rails moves downwardly and the magnet carrier collar 53 also moves downwardly to a position where a second magnet 61 is aligned with the Hall effect sensor 56.

Magnet 60 has a magnetic north pole facing the sensor 56 and magnet 61 has a magnetic south pole facing the Hall effect sensor 56. The Hall effect sensor 56 is sensitive to the polarity of the magnets. Thus, when the magnet 60 is adjacent to Hall effect sensor 56 there is a positive indication that the seat is unoccupied, and when the magnet 61 is aligned with or moves past the Hall effect sensor 56 as the seat moves downwardly, there is a second positive signal that the seat is occupied is received. This provides two positioning signals, which are used for the overall system operation. The magnetic poles facing the Hall effect sensor can be reversed in position if desired. The collar 53 is held properly oriented relative to the Hall effect sensor by a suitable sliding key. As shown a finger like key 70 that slides in a bore 71 formed in the magnet carrier collar 53 as the seat and thus the collar 53 move up or down. The finger like key 70 is fixed to the flange 52 and slipped into place in the bore 71 when the collar is installed on the bushing 46.

The positive sensing of the operator presence or absence, provides a signal that indicates that an operator is or is not in the seat. The sensing system utilizing a Hall effect sensor and a magnet that affects the output of the Hall effect sensor is not affected by rust or dirt or foreign materials, and there is no contact between the components.

The seat rail assembly 30 on the other side of the seat pan does not have a sensor, but the stud 48 on the rear of that rail has a sleeve 67 thereon that passes through an opening in the seat pan wall 14. A washer 63 and lock nut 64 are placed below the seat pan and hold the sleeve 67 in place. The washer 63 provides an upward stop for the seat at the desired level. This means both seat rails are stopped in upward direction and the leaf spring is used to preload the rails upwardly against the stops. The sleeve 67 also fits into a "U" shaped slot at the rear end of the aligning spring 40 to keep it in place below the base rail 32.

Again, as stated where the seat is relatively light weight only one leaf spring under one rail will work satisfactorily.

Although the present invention has been described with reference to preferred embodiments, workers skilled in the art will recognize that changes may be made in form and detail without departing from the spirit and scope of the invention.

What is claimed is:

1. An operator presence sensor for the seat of a vehicle comprising a base plate, a longitudinal rail member supporting the seat, a forward end of the rail member mounted relative to the base plate to permit movement of a rear end of the rail member, a leaf spring mounted relative the base plate and proximate the forward end, the leaf spring extending along substantially the entire length of the longitudinal rail member and having a portion that is bent to bear directly on the rail member and deflect the rear end of the rail member and the seat upwardly, the rear end of the rail member being movable toward and away from the base plate, a position sensor having two components, one mounted relative to the rail member and the other component being mounted relative to the base member to sense movement of the rear end of the rail member when a predetermined load is placed on the seat and the leaf spring deflects a predetermined amount.

2. The presence sensor of claim 1 and a bushing fixed to the rear end of the rail member and extending through an opening in the base plate to a lower side of the base plate, the one component of the position sensor being mounted on said bushing below the base plate.

3. The presence sensor of claim 2 wherein the other component comprises a Hall effect sensor for sensing presence of a magnetic field from a magnet mounted on the bushing.

4. The presence sensor of claim 3 wherein said magnet comprises at least two magnetic poles positioned to affect the Hall effect sensor to indicate two positions of the seat.

5. The presence sensor of claim 3 wherein the seat is supported on a pair of laterally spaced rail members and each rail member is mounted to permit the rear end thereof to move relative to the base plate, and wherein each rail member has a leaf spring associated therewith.

6. The presence sensor of claim 1 and means to fix the front end of the rail member to the base plate comprising a stud that is fixed to the rail member, and a spacer between the rail and the base plate, the leaf spring having an opening therein receiving the spacer so the leaf spring is held between the rail member and the base plate when the rail member is clamped by the stud to the base plate.

7. An operator's presence sensor for the seat of a vehicle having a base plate and a seat supported on adjustable rails relative to the base plate, the improvement comprising forward ends of the rails being mounted relative to the base plate for permitting rear ends of the rails to move up and down relative to the base plate, a leaf spring extending substantially the entire length along at least one longitudinal rail and having a portion that is bent to resiliently deflect rearward portions of the rails upwardly wherein the leaf spring is connected to the base plate and the forward end of the at least one rail, a sensor component mounted on the rear portion of one rail and movable with the rail as the rails move toward and away from the base plate, and a second sensor component spaced-apart from the sensor component and mounted to sense movement of the one component when the leaf spring deflects a predetermined amount wherein the sensor components remain spaced-apart from each other as the rails move up and down relative the base plate.

8. The presence sensor of claim 7 wherein said leaf spring has a bend in the midportion thereof such that rear end of the leaf spring contacts the associated rail to urge the seat away from the base plate.

9. The presence sensor of claim 8 wherein there are two leaf springs, one associated with each rail.

10. The presence sensor of claim 9 and means connected to each rail to limit the movement of the rear ends of the rails in a direction away from the base plate.

* * * * *